United States Patent
Wang et al.

(10) Patent No.: US 12,021,400 B2
(45) Date of Patent: Jun. 25, 2024

(54) VOLTAGE BALANCING SYSTEM FOR BALANCING UNBALANCED BATTERY PACK VOLTAGE CAUSED BY NON-CASCADE OF ANALOG FRONT ENDS

(71) Applicant: Globe (Jiangsu) Co., Ltd, Jiangsu (CN)

(72) Inventors: Huage Wang, Jiangsu (CN); Baoan Li, Jiangsu (CN); Xian Zhuang, Jiangsu (CN); Chuanjun Liu, Jiangsu (CN); Zhiyuan Li, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 55 days.

(21) Appl. No.: 17/038,080

(22) Filed: Sep. 30, 2020

(65) Prior Publication Data
US 2021/0111567 A1 Apr. 15, 2021

(30) Foreign Application Priority Data
Oct. 12, 2019 (CN) .......................... 201910967173.3

(51) Int. Cl.
*H02J 7/00* (2006.01)

(52) U.S. Cl.
CPC .......... *H02J 7/0014* (2013.01); *H02J 7/0013* (2013.01); *H02J 7/0047* (2013.01); *H02J 7/0063* (2013.01); *H02J 2207/20* (2020.01)

(58) Field of Classification Search
CPC .... H02J 7/0014; H02J 7/0047; H02J 2207/20; H02J 7/0013; H02J 7/0063
USPC ........................................................ 320/116
See application file for complete search history.

(56) References Cited

U.S. PATENT DOCUMENTS

| | | | |
|---|---|---|---|
| 5,698,967 A | 12/1997 | Baer et al. | |
| 2009/0045778 A1* | 2/2009 | Cawthorne | H02J 7/0021 320/134 |
| 2009/0284224 A1* | 11/2009 | Miyazaki | H02J 7/0019 320/118 |
| 2010/0001737 A1* | 1/2010 | Kubo | H02J 7/0013 324/434 |

(Continued)

FOREIGN PATENT DOCUMENTS

| | | | | |
|---|---|---|---|---|
| JP | 2011134578 A | * | 7/2011 | .......... H01M 10/052 |
| KR | 20150048008 A | * | 5/2015 | ............ H02J 7/0014 |

(Continued)

OTHER PUBLICATIONS

Extended European Search Report of counterpart European Patent Application No. 20201059.1 dated Feb. 18, 2021.

*Primary Examiner* — Richard Isla
*Assistant Examiner* — Manuel Hernandez

(57) ABSTRACT

The invention provides a voltage balancing system for voltage balancing. The voltage balancing system includes an analog front end arranged in parallel with the cell group, a micro control unit communicating with the analog front end, a communication isolation module connected between the analog front end and the micro control unit, and a balancing module. The input of the balancing module is connected to the cell group to input the total voltage of the cell group. The output of the balancing module is connected to the micro control unit and the communication isolation module to output the operating voltage of the micro control unit and the communication isolation module.

8 Claims, 7 Drawing Sheets

(56) References Cited

U.S. PATENT DOCUMENTS

| | | | |
|---|---|---|---|
| 2011/0291618 A1 | 12/2011 | Li | |
| 2012/0101756 A1* | 4/2012 | Leung | G01K 1/026 |
| | | | 702/64 |
| 2012/0179399 A1* | 7/2012 | Yun | H01M 10/441 |
| | | | 702/63 |
| 2015/0241520 A1 | 8/2015 | Ohtake | |
| 2016/0380443 A1* | 12/2016 | Jeon | H02J 7/0014 |
| | | | 320/112 |
| 2019/0229650 A1* | 7/2019 | Demont | B60L 50/40 |
| 2021/0088597 A1* | 3/2021 | Wang | G01R 31/385 |

FOREIGN PATENT DOCUMENTS

| | | | | |
|---|---|---|---|---|
| WO | WO-2012117503 A1 | * | 9/2012 | ............. B60L 58/18 |
| WO | 2018098628 A1 | | 6/2018 | |

\* cited by examiner

VOLTAGE BALANCING SYSTEM FOR BALANCING UNBALANCED BATTERY PACK VOLTAGE CAUSED BY NON-CASCADE OF ANALOG FRONT ENDS

CROSS-REFERENCE TO RELATED INVENTIONS

This application is a US application which claims the priority of CN invention Serial No. 201910967173.3, filed on Oct. 12, 2019, the disclosures of which are hereby incorporated by reference in their entirety.

TECHNICAL FIELD

The application relates to a voltage balancing system.

BACKGROUND ART

At present, multiple cells of battery pack are usually connected in series in order to output high voltage. The number of cells managed by the analog front end (AFE) is limited, so two or more AFEs are used to manage them separately. In the market, some AFEs can be cascaded, but some cannot. For AFE that cannot be cascaded, a communication isolation chip is used between the AFE and a micro control unit (MCU) to achieve communication between the AFE and the MCU. However, both isolated sides of the communication isolation chip need to be powered at the same time to make it work properly.

As shown in FIG. 1, in general, the power supply on both sides of the communication isolation chip 1 is taken from V1 and V2 output by the internal power managers of the two AFEs, and the MCU's power supply is also taken from V1. The entire system is relatively simple, but after multiple charge and discharge cycles, the high-side cell voltage and the low-side cell voltage are unbalanced. The voltage of high-side cell is significantly higher than the voltage of low-side cell. The reason for the imbalance of the low-side and the high-side cell voltage is that the power consumption of the low-side cell is higher than that of the high-side cell. For example, V1 needs to power the MCU and the B side of the communication isolation chip 1, and V2 only needs to power the A side of the communication isolation chip 1. Obviously, the power consumption of V1 is greater than that of the 3V2, and the power consumption of the A-side of the communication isolation chip 1 is different from that of the B-side power consumption of the communication isolation chip 1.

In view of this, it is really necessary to propose a voltage balancing system to solve the above problems.

SUMMARY OF INVENTION

The purpose of the present invention is to provide a voltage balancing system to solve the problem of unbalanced battery pack voltage caused by the non-cascade of the AFEs.

To achieve the above object, the present invention provides a voltage balancing system for voltage balancing comprising: a first group of cells comprising a plurality of cells, a second group of cells comprising a plurality of cells and connecting with the first group of cells in series, a low side analog front end arranged in parallel with the first cell group, a high side analog front end arranged in parallel with the second cell group, a micro control unit communicating with the low side analog front end and the high side analog front end, a communication isolation module connecting the second analog front end with the micro control unit and a balancing module, wherein an input of the balancing module is connected to the cell groups to input a total voltage of the cell groups, and an output of the balancing module is respectively connected to the micro control unit and the communication isolation module to output the operating voltage to the micro control unit and the communication isolation module.

As a further improvement of the present invention, the low-side analog front end communicates with the micro control unit through a first communication channel.

As a further improvement of the present invention, the communication isolation module communicates with the micro control unit through a second communication channel.

As a further improvement of the present invention, the high-side analog front end is not cascaded with the low-side analog front end.

As a further improvement of the present invention, the cell group further comprises a third group of cells connected in series with the first group of cells and the second group of cells, a communication isolation module connecting the analog front end corresponding to the third group of cells and the micro control unit. The output of the balancing module is connected to the micro control unit and the two communication isolation modules, respectively.

As a further improvement of the present invention, the balancing module is a step-down chip.

As a further improvement of the present invention, the step-down chip is a low-dropout linear regulator.

As a further improvement of the present invention, the step-down chip is a step-down DC-DC converter.

As a further improvement of the present invention, the communication isolation module is an isolation chip, and an isolated DC/DC converter is integrated inside the isolation chip.

As a further improvement of the present invention, when the low side analog end and the high side analog end have no ADC modules integrated inside, a subtractor comprises a positive input connected to an output of the high side analog front end and a negative input connected to a total positive of the low side analog front end, an output of the subtractor is connected to the MCU.

The beneficial effect of the present invention is that the voltage balancing system of the present invention is provided with a balancing module, and the input of the balancing module is connected to the cell group to input the total voltage of the cell group. At the same time, the output of the balancing module is connected with the micro control unit and the communication isolation module to ensure that both the micro control unit and the communication isolation module take power from the total voltage, thereby avoiding the occurrence of the unbalanced battery voltages at the high and low sides.

DESCRIPTION OF EMBODIMENT

In order to make the objectives, technical solutions, and advantages of the present invention clearer, the following describes the present invention in detail with reference to the accompanying drawings and specific embodiment.

The invention discloses a voltage balancing system for performing balancing control of the voltage of the cells in the battery pack. For the convenience and clarity of description, the battery cells include two groups of cells as an example for detailed description, but it should not be limited to this.

Figure 1:
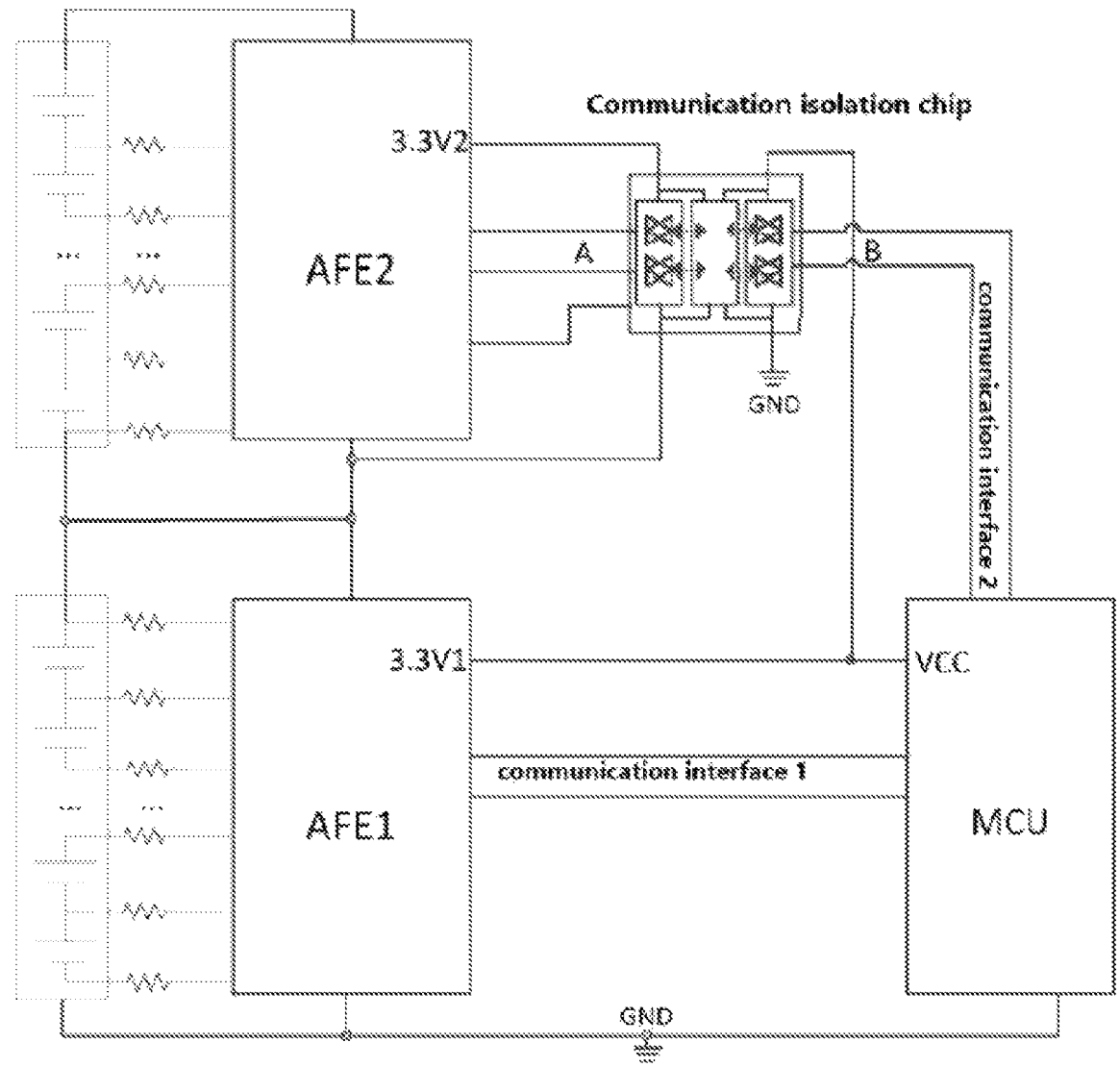
FIG. 1 is a schematic diagram of a conventional battery pack voltage management system.
Figure 2:
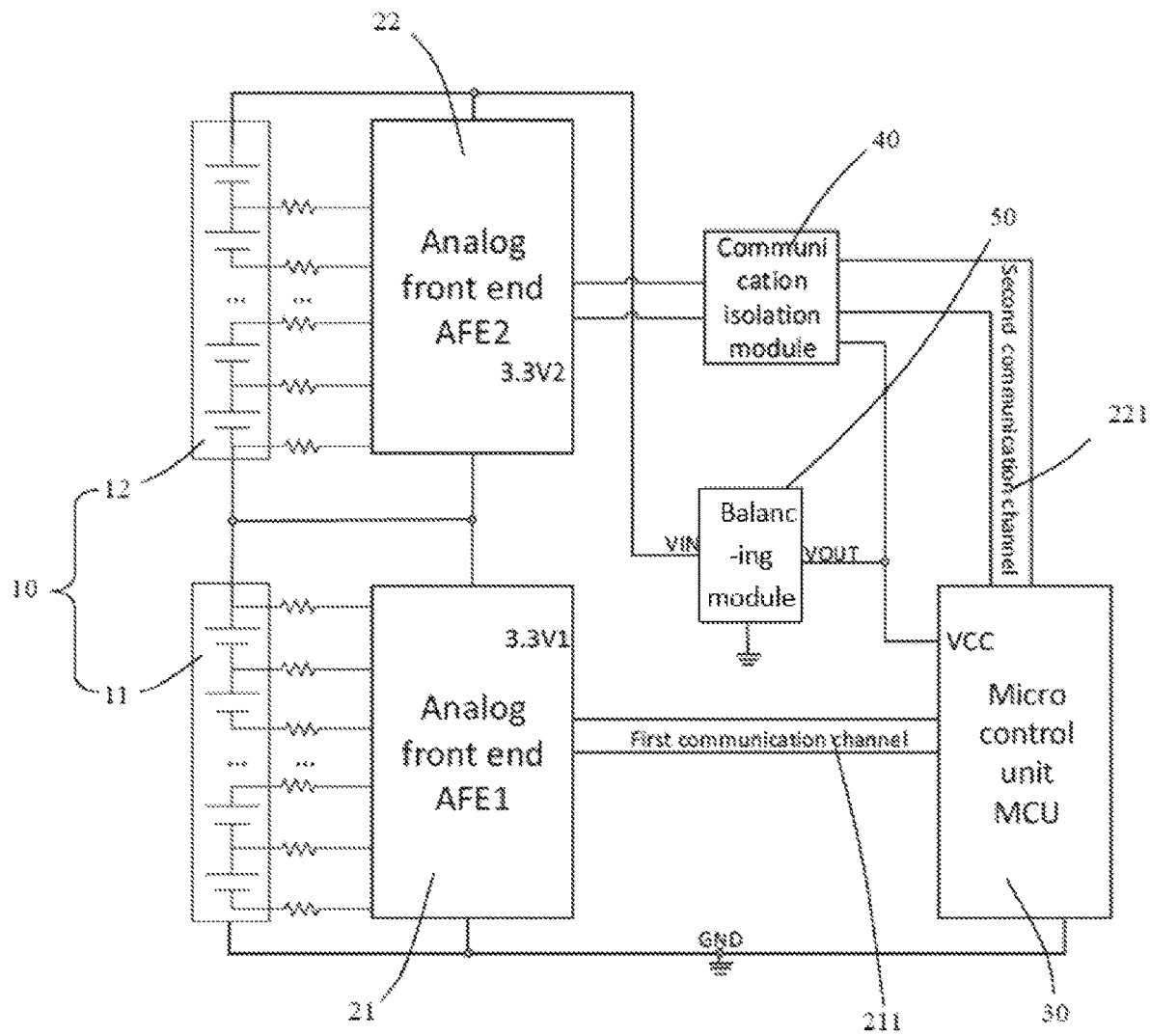
FIG. 2 is a schematic structural diagram of a voltage balancing system according to the present invention.
Figure 3:
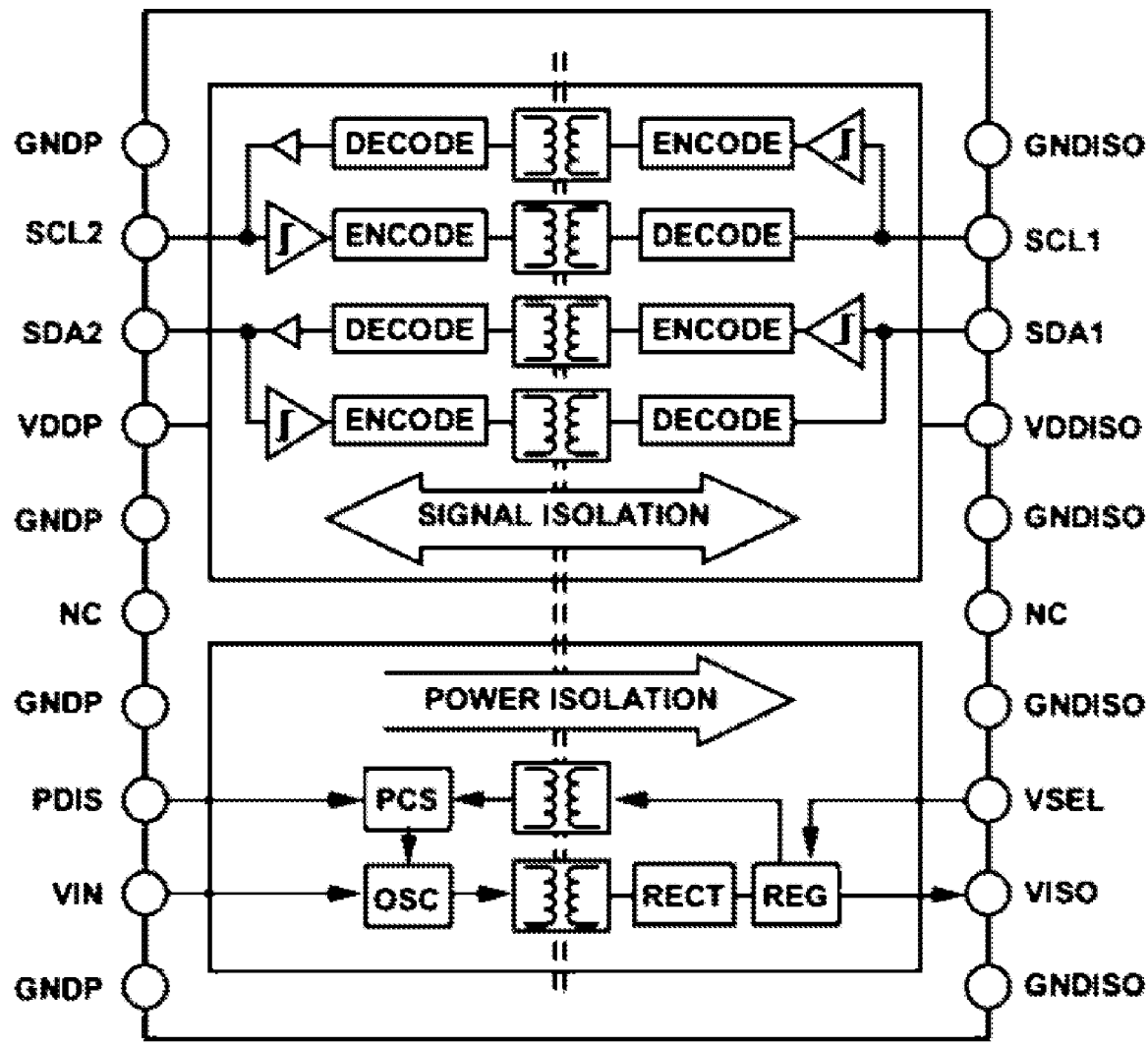
FIG. 3 is a functional block diagram of the communication isolation module shown in FIG. 2.

As shown in FIG. 2 and FIG. 3, the voltage balancing system includes at least two analog front ends (AFE), a micro control unit (MCU) 30, a communication isolation module 40, and a balancing module 50.

The cell groups 10 are defined as including a first group of cells 11 and a second group of cells 12, and the first group of cells 11 and the second group of cells 12 are connected in series with each other. The analog front end (AFE) is provided in parallel with the cell groups 10 and includes a low-side analog front end 21 connected in parallel with the first group of cells 11 and a high-side analog front end 22 connected in parallel with the second group of cells 12. The low-side analog front end 21 is used to acquire the analog voltage of the first group of cells 11 and transmits it to the micro control unit 30. The high-side analog front end 22 is used to acquire the analog voltage of the second group of cells 12 and transmits it to the micro control unit 30.

Preferably, an analog-to-digital converter (i.e., an ADC module) is integrated inside the low-side analog front end 21 and the high-side analog front end 22, respectively. The low-side analog front end 21 and the micro control unit 30 communicate through the first communication channel 211, so when the micro control unit 30 needs to acquire the analog voltage of any battery cell in the first group of cells 11, the first communication channel 211 can be used to transmit instructions. After receiving such instructions, the low-side analog front end 21 will quickly detect the analog voltage value of the corresponding cell. At the same time, because the low-side analog front end 21 is integrated with the ADC module, after the low-side analog front end 21 detects the analog voltage value of the cell in first group of cells 11, the analog voltage value can be directly converted into a digital value and the digital value is transmitted to the micro control unit 30 through the first communication channel 211.

The high-side analog front end 22 and the low-side analog front end 21 are not cascaded, so a communication isolation module 40 needs to be provided to achieve communication between the high-side analog front end 22 and the micro control unit 30. Specifically, the communication isolation module 40 is connected between the high-side analog front end 22 and the micro control unit 30. The communication isolation module 40 connects the communication interface of the high-side analog front end 22 and the communication interface of the micro control unit 30, thereby realizing the communication between the high-side analog front end 22 and the micro control unit 30. Preferably, the high-side analog front end 22, the communication isolation module 40 and the micro control unit 30 communicate with each other through the second communication channel 221, and the specific communication process can refer to the communication process between the low-side analog front end 21 and the micro control unit 30, which is not described here.

In this embodiment, the communication isolation module 40 is an isolation chip, and an isolated DC/DC converter is integrated inside the isolation chip. Therefore, the isolation chip only needs to be powered on one side, and does not need to be powered on both sides.

The input VIN of the balancing module 50 is connected to the cell groups 10 to input the total voltage of the cell groups 10 (that is, the sum of the voltages of the first group of cells 11 and the second group of cells 12). The output VOUT of the balancing module 50 is respectively connected to the micro control unit 30 and the communication isolation module 40 to output the operating voltage (such as 3.3V) of the micro control unit 30 and the communication isolation module 40, thereby powering the micro control unit 30 and the communication isolation module 40 simultaneously. The purpose of this design is to enable both the micro control unit 30 and the communication isolation module 40 to take power from the total voltage, and the operating voltage of the micro control unit 30 and the communication isolation module 40 are the same, thereby avoiding the occurrence of unbalanced battery voltage at the high side and low side.

In this embodiment, the balancing module 50 is a step-down chip, which is used to directly step-down the voltage to a predetermined voltage after the input VIN of the balancing module 50 receives the total voltage of the cell groups 10. Thereby, the output VOUT of the balancing module 50 can safely power the micro control unit 30 and the communication isolation module 40. At this time, the voltage output by the output VOUT is the operating voltage of the micro control unit 30 and the communication isolation module 40. Preferably, the step-down chip may be a low dropout regulator (LDO) or a step-down DC-DC converter.

Figure 4:
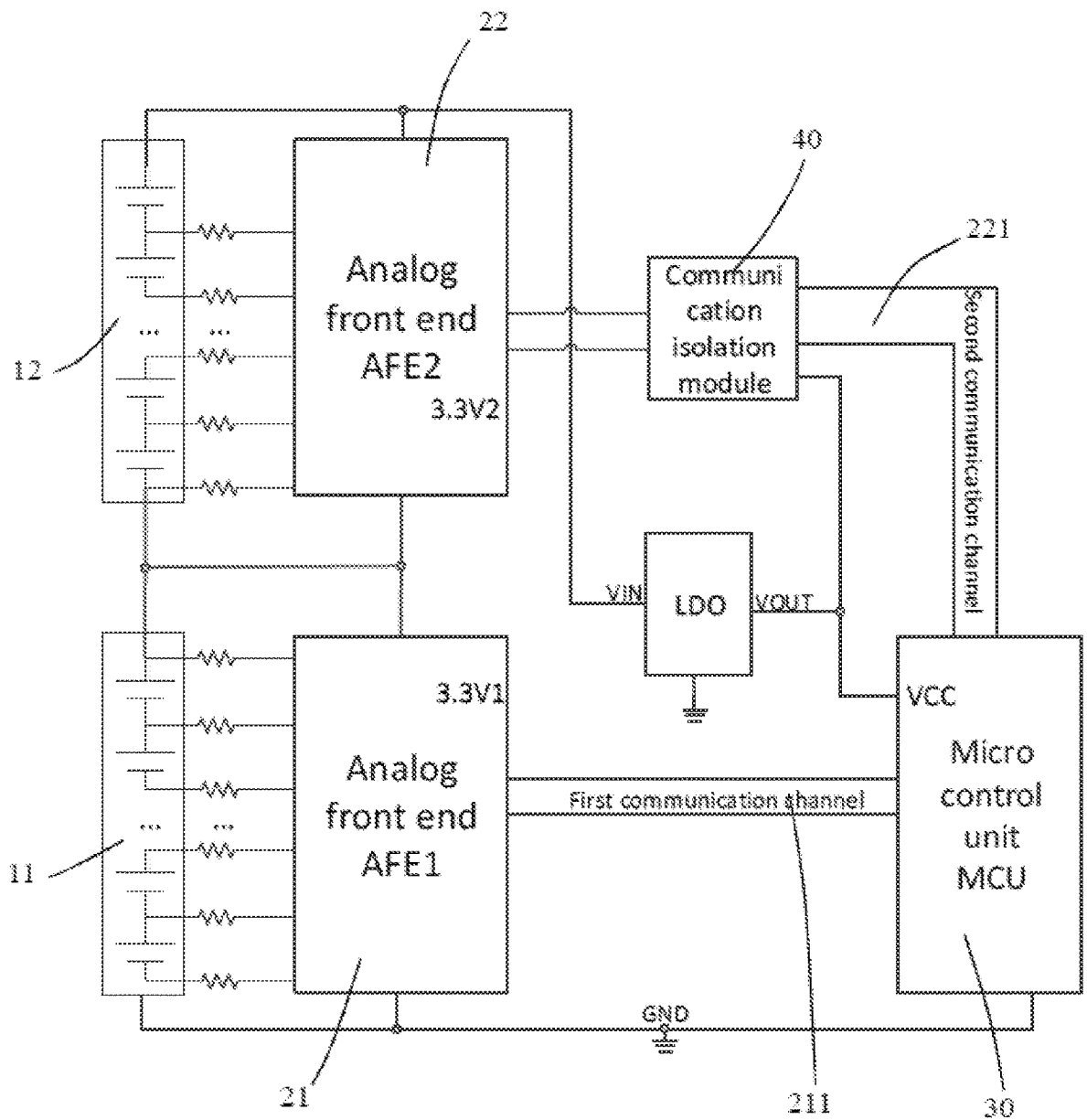
FIG. 4 is a schematic structural diagram of a first embodiment of the voltage balancing system shown in FIG. 2.

As shown in FIG. 4, it is a first specific embodiment of the voltage balancing system of the present invention. In this embodiment, the step-down chip 50 is an LDO. In this embodiment, the voltage balancing system of the present invention has the advantages of good stability, fast load response, and small output ripple.

Figure 5:
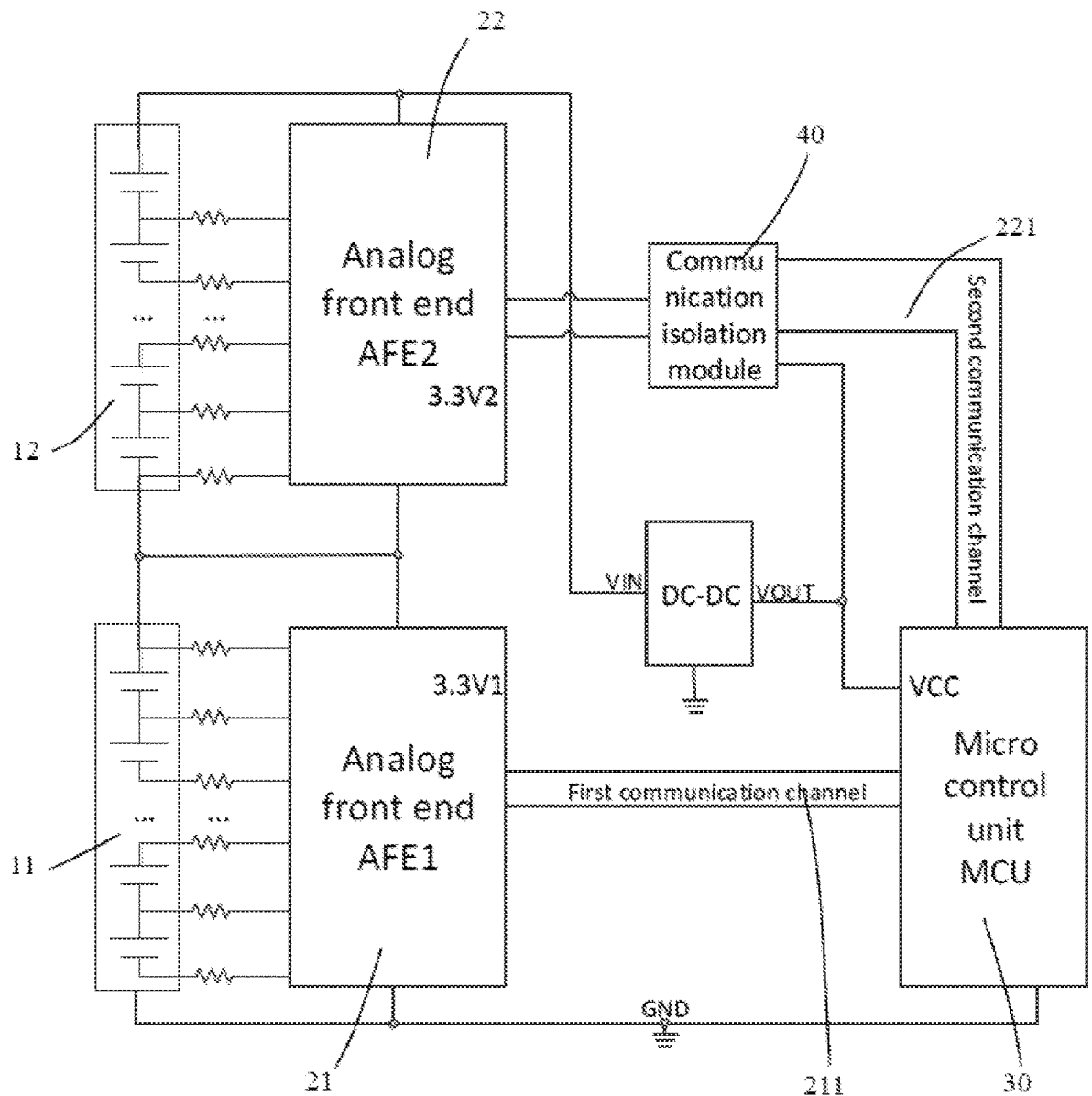
FIG. 5 is a schematic structural diagram of a second embodiment of the voltage balancing system shown in FIG. 2.

As shown in FIG. 5, it is a second specific embodiment of the voltage balancing system of the present invention. In this embodiment, the step-down chip 50 is a step-down DC-DC converter. In this embodiment, the voltage balancing system of the present invention has the advantages of high efficiency and wide input voltage range. Of course, strictly, LDO also belongs to a type of DC-DC converter, but the current DC-DC converter refers to a switching power supply.

Figure 6:
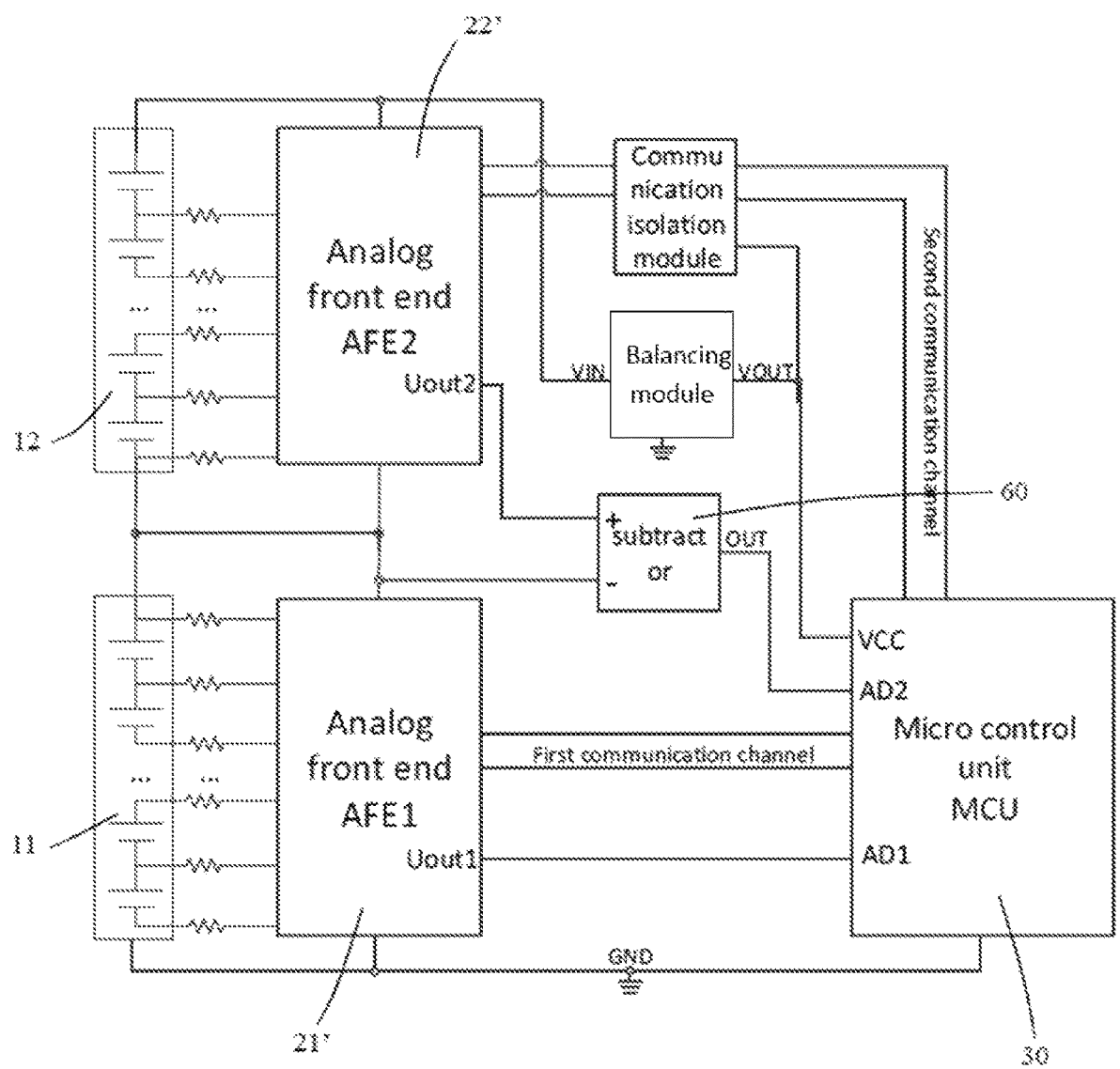
FIG. 6 is a schematic structural diagram of a third embodiment of the voltage balancing system shown in FIG. 2.

As shown in FIG. 6, it is a third embodiment of the voltage balancing system of the present invention. In this embodiment, neither the low-side analog front end 21' nor the high-side analog front end 22' has an integrated analog-to-digital converter (i.e., an ADC module). In this embodiment, the voltage balancing system of the present invention further includes a subtractor 60 for obtaining the analog voltage (i.e., the actual voltage) of the second group of cells 12 output by the high-side analog front end 22' with respect to the ground.

For the first group of battery cells 11 and the low-side analog front end 21', the interface Uout1 of the low-side analog front end 21' is connected to the interface AD1 of the micro control unit 30, so that the low-side analog front end 21' detects the corresponding cell's analog voltage, and then it can be directly output to the micro control unit 30.

For the second group of cells 12 and the high-side analog front end 22', the positive input of the subtractor 60 is connected to the interface Uout2 of the high-side analog front end 22' to receive the voltage output by the high-side analog front end 22'. The negative input of the subtractor 60 is connected to the total positive of the first group of cells 11 to input the total voltage of the first group of cells 11. The output OUT of the subtractor 60 is connected to the interface AD2 of the micro control unit 30 to transmit the analog voltage (i.e., the actual voltage) of the second group of cells 12 relative to the ground output by the subtractor 60 to the micro control unit 30.

It should be noted that when GND is used as a reference, the voltage value output by the low-side analog front end 21' is the detected actual voltage value of the first group of cells 11, and the voltage value output by the high-side analog front end 22' is the value of the actual voltage value of the second group of cells 12 superimposed on the total voltage of the first group of cells 11. Therefore, if the real voltage value of the detected second group of cells 12 is to be obtained, the total voltage of the first group of cells 11 needs be subtracted by the subtractor 60.

In addition, the first communication channel, the second communication channel, the balancing module, and the communication isolation module shown in FIG. 6 and the first communication channel 211, the second communication channel 221, the balancing module 50, and the communication isolation module 40 shown in FIG. 2 have the same structure, the same connection relationship, and the same function, which will not be described in detail here.

Figure 7:
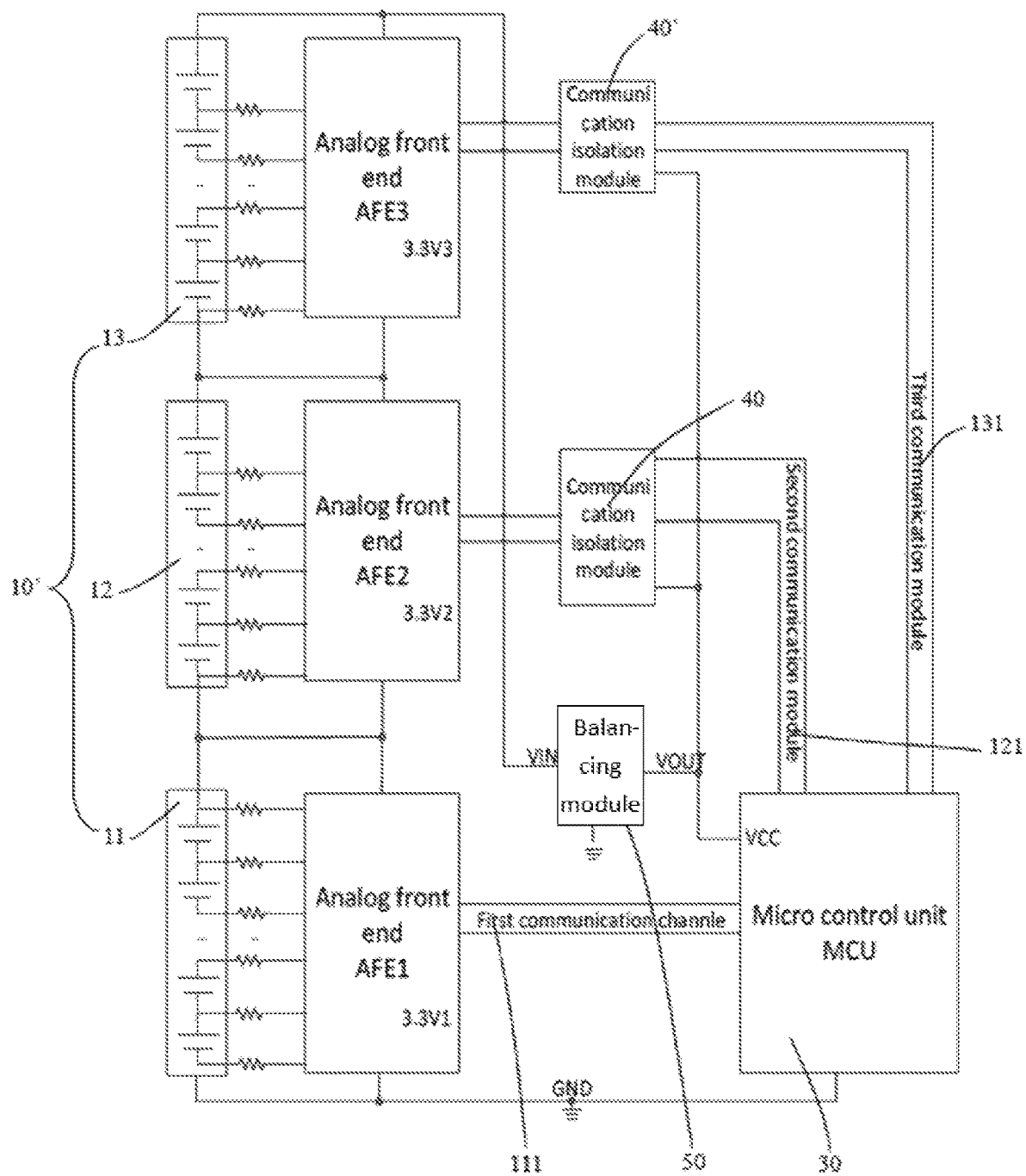
FIG. 7 is a schematic structural diagram when the voltage balancing system shown in FIG. 2 is applied to three groups of AFEs.

As shown in FIG. 7, it is a schematic structural diagram when the voltage balancing system shown in FIG. 2 is applied to three sets of analog front ends. It can be seen from the figure that the voltage balancing system of the present invention is not only applicable to the two sets of analog front ends, but also applicable to the three or more sets of analog front ends. In either case, only a balancing module 50 is needed to achieve the balancing of the high and low-side battery voltages.

When the voltage balancing system of the present invention is applied to three sets of analog front ends, the first group of cells 11, the second group of cells 12, and the third group of cells 13 are connected in series with each other. The analog front end AFE1 is connected in parallel with the first group of cells 11, the analog front end AFE2 is connected in parallel with the second group of cells 12, and the analog front end AFE3 is connected in parallel with the third group of cells 13. The micro control unit 30 can simultaneously communicate to the analog front end AFE1, the analog front end AFE2, and the analog front end AFE3, so that the analog voltage of the first group of cells 11 can be acquired by the analog front end AFE1 and transmitted to the micro control unit 30, the analog voltage of the second group of cells 12 can be acquired by the analog front end AFE2 and transmitted to the micro control unit 30, and the analog voltage of the third group of cells 13 can be acquired by the analog front end AFE3 and transmitted to the micro control unit 30.

At the same time, the analog front end AFE1 communicates with the micro control unit 30 through the first communication channel 111, the analog front end AFE2 and the micro control unit 30 are connected with a communication isolation module 40 and they communicate with each other through a second communication channel 121, and the analog front end AFE3 and the micro control unit 30 are connected with a communication isolation module 40' and they communicate with each other through a third communication channel 121.

It should be noted that there is only one balancing module 50 in the voltage balancing system shown in FIG. 7, and the input VIN of the balancing module 50 is connected to the cell groups 10' to input the total voltage of the cell groups 10' (that is, the sum of the voltages of the first group of cells 11, the second group of cells 12, and the third group of cells 13). The output VOUT of the balancing module 50 respectively connects with the micro control unit 30, the communication isolation module 40 and 40' to output the operating voltage (such as 3.3V) to power the micro control unit 30, the communication isolation module 40, 40' at the same time.

On the one hand, this arrangement can allow the micro control unit 30, the communication isolation module 40 and 40' all take the power from the total voltage, and the operating voltage of the micro control unit 30, the communication isolation module 40 and 40' is the same to avoid the imbalance of the battery voltage on the high and low sides. On the other hand, using one balancing module 50 can achieve an effect of simple structure and low cost.

By analogy, when the voltage balancing system of the present invention is applied to four sets of analog front ends, a balancing module 50 can also be used to solve the problem of battery voltage imbalance on high and low-side. At this time, the output of the balancing module 50 can only be connected to the communication isolation module corresponding to the analog front end AFE4, which will not be described in detail here.

In summary, the voltage balancing system of the present invention is provided with a balancing module 50, and the input VIN of the balancing module 50 is connected to the cell groups 10 and 10' to input the total voltage of the battery packs 10 and 10'. The output VOUT of the balancing module 50 is connected to the micro control unit 30 and the communication isolation modules 40 and 40', respectively, so as to ensure that the micro control unit 30 and the communication isolation modules 40 and 40' take power from the total voltage, which can avoid the battery voltage unbalance between high side and low side.

The above embodiment is only used to illustrate the technical solution of the present invention and is not limiting. Although the present invention has been described in detail with reference to the preferred embodiment, those skilled in the art should understand that the technical solution of the present invention may be modified or equivalently replaced, without departing from the spirit and scope of the technical solution of the present invention.

What is claimed is:

1. A voltage balancing system for balancing unbalanced battery pack voltage caused by non-cascade of analog front ends, comprising:
   a micro control unit;
   a low side cell group comprising at least one battery cell;
   a low side analog front end arranged in parallel with the low side cell group and configured to acquire an analog voltage of the low side cell group and transmit the analog voltage of the low side cell group to the micro control unit;
   a high side cell group comprising at least one battery cell, the high side cell group connecting with the low side cell group in series;
   a high side analog front end arranged in parallel with the high side cell group and configured to acquire an analog voltage of the high side cell group and transmit the analog voltage of the high side cell group to the micro control unit, the high side analog front end being not cascaded with the low side analog front end;

a communication isolation module connecting the high side analog front end with the micro control unit, but no another communication isolation module connecting the low side analog front end with the micro control unit; and a balancing module;

wherein an input of the balancing module is connected to an end which outputs a total voltage of the high side and low side cell groups connected in series, and an output of the balancing module is respectively connected to the micro control unit and the communication isolation module to output an operating voltage to the micro control unit and the communication isolation module;

wherein the low side analog front end communicates with the micro control unit through a low side communication channel; and the high side analog front end, the communication isolation module and the micro control unit communicate with each other through a high side communication channel, the low side communication channel being isolated with the high side communication channel;

wherein the balancing module is a step-down chip;

wherein when the low side analog end and the high side analog end have no analog-to-digital converters integrated inside, the voltage balancing system further comprises a subtractor, the subtractor comprising a positive input connected to an output of the high side analog front end, a negative input connected to a total positive of the low side analog front end, and an output connected to the micro control unit.

2. The voltage balancing system according to claim 1, further comprising:

an additional high side cell group connected in series with the low side cell group and the high side cell group, the additional high side cell group comprising at least one battery cell;

an additional high side analog front end arranged in parallel with the additional high side cell group and configured to acquire an analog voltage of the additional high side cell group and transmit the analog voltage of the additional high side cell group to the micro control unit; and an additional communication isolation module connecting the additional high side analog front end with the micro control unit, the output of the balancing module being connected to the additional communication isolation module;

wherein the additional high side analog front end, the additional communication isolation module and the micro control unit communicate with each other through an additional high side communication channel; the additional high side communication channel being isolated with the low side communication channel and the high side communication channel.

3. The voltage balancing system according to claim 1, wherein the low side analog front end communicates with a first pair of ports of the micro control unit through the low side communication channel; and the high side analog front end, the communication isolation module and a second pair of ports of the micro control unit communicate with each other through the high side communication channel, the second pair of ports being different from the first pair of ports.

4. The voltage balancing system according to claim 3, further comprising:

an additional high side cell group connected in series with the low side cell group and the high side cell group, the additional high side cell group comprising at least one battery cell;

an additional high side analog front end arranged in parallel with the additional high side cell group and configured to acquire an analog voltage of the additional high side cell group and transmit the analog voltage of the additional high side cell group to the micro control unit; and an additional communication isolation module connecting the additional high side analog front end with the micro control unit, the output of the balancing module being connected to the additional communication isolation module;

wherein the additional high side analog front end, the additional communication isolation module and the micro control unit communicate with each other through an additional high side communication channel, the additional high side communication channel being isolated with the low side communication channel and the high side communication channel.

5. The voltage balancing system according to claim 4, wherein the additional high side analog front end, the additional communication isolation module and a third pair of ports of the micro control unit communicate with each other through the additional high side communication channel, the third pair of ports being different from the first pair of ports and the second pair of ports.

6. The voltage balancing system according to claim 1, wherein the communication isolation module is an isolation chip, and an isolated DC/DC converter is integrated inside the isolation chip.

7. A voltage balancing system for balancing unbalanced battery pack voltage caused by non-cascade of analog front ends, comprising:

a micro control unit;

a low side cell group comprising at least one battery cell;

a low side analog front end arranged in parallel with the low side cell group and configured to acquire an analog voltage of the low side cell group and transmit the analog voltage of the low side cell group to the micro control unit;

a high side cell group comprising at least one battery cell, the high side cell group connecting with the low side cell group in series;

a high side analog front end arranged in parallel with the high side cell group and configured to acquire an analog voltage of the high side cell group and transmit the analog voltage of the high side cell group to the micro control unit, the high side analog front end being not cascaded with the low side analog front end;

a communication isolation module connecting the high side analog front end with the micro control unit, but no another communication isolation module connecting the low side analog front end with the micro control unit; and a balancing module;

wherein an input of the balancing module is connected to an end which outputs a total voltage of the high side and low side cell groups connected in series, and an output of the balancing module is respectively connected to the micro control unit and the communication isolation module to output an operating voltage to the micro control unit and the communication isolation module;

wherein the low side analog front end communicates with the micro control unit through a low side communication channel; and the high side analog front end, the communication isolation module and the micro control unit communicate with each other through a high side communication channel, the low side communication channel being isolated with the high side communication channel;

wherein the balancing module is a step-down chip;

wherein the step-down chip is a low-dropout linear regulator;

wherein when the low side analog end and the high side analog end have no analog-to-digital converters integrated inside, the voltage balancing system further comprises a subtractor, the subtractor comprising a positive input connected to an output of the high side analog front end, a negative input connected to a total positive of the low side analog front end, and an output connected to the micro control unit.

8. A voltage balancing system for balancing unbalanced battery pack voltage caused by non-cascade of analog front ends, comprising:

a micro control unit;

a low side cell group comprising at least one battery cell;

a low side analog front end arranged in parallel with the low side cell group and configured to acquire an analog voltage of the low side cell group and transmit the analog voltage of the low side cell group to the micro control unit;

a high side cell group comprising at least one battery cell, the high side cell group connecting with the low side cell group in series;

a high side analog front end arranged in parallel with the high side cell group and configured to acquire an analog voltage of the high side cell group and transmit the analog voltage of the high side cell group to the micro control unit, the high side analog front end being not cascaded with the low side analog front end;

a communication isolation module connecting the high side analog front end with the micro control unit, but no another communication isolation module connecting the low side analog front end with the micro control unit; and a balancing module;

wherein an input of the balancing module is connected to an end which outputs a total voltage of the high side and low side cell groups connected in series, and an output of the balancing module is respectively connected to the micro control unit and the communication isolation module to output an operating voltage to the micro control unit and the communication isolation module;

wherein the low side analog front end communicates with the micro control unit through a low side communication channel; and the high side analog front end, the communication isolation module and the micro control unit communicate with each other through a high side communication channel, the low side communication channel being isolated with the high side communication channel;

wherein the balancing module is a step-down chip;

wherein the step-down chip is a step-down DC-DC converter;

wherein when the low side analog end and the high side analog end have no analog-to-digital converters integrated inside, the voltage balancing system further comprises a subtractor, the subtractor comprising a positive input connected to an output of the high side analog front end, a negative input connected to a total positive of the low side analog front end, and an output connected to the micro control unit.

\* \* \* \* \*